(12) United States Patent
Meiri

(10) Patent No.: US 11,068,500 B1
(45) Date of Patent: Jul. 20, 2021

(54) REMOTE SNAPSHOT ACCESS IN A REPLICATION SETUP

(71) Applicant: EMC IP Holding Company, LLC, Hopkinton, MA (US)

(72) Inventor: David Meiri, Cambridge, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 408 days.

(21) Appl. No.: 15/280,638

(22) Filed: Sep. 29, 2016

(51) Int. Cl.
*G06F 16/27* (2019.01)
*H04L 29/08* (2006.01)
*G06F 16/23* (2019.01)

(52) U.S. Cl.
CPC .......... *G06F 16/27* (2019.01); *G06F 16/2379* (2019.01); *H04L 67/1095* (2013.01)

(58) Field of Classification Search
CPC ......... G06F 17/30575; G06F 17/30377; G06F 16/27; G06F 16/2379; H04L 67/1095
See application file for complete search history.

(56) References Cited

U.S. PATENT DOCUMENTS

| | | | | |
|---|---|---|---|---|
| 7,870,356 B1* | 1/2011 | Veeraswamy | ....... | G06F 16/1744 711/162 |
| 8,850,143 B1* | 9/2014 | Natanzon | ............ | G06F 11/1471 707/684 |
| 9,384,252 B2* | 7/2016 | Akirav | ................ | G06F 11/1451 |
| 9,934,302 B1* | 4/2018 | Cohen | ............... | G06F 17/30578 |
| 2006/0075200 A1* | 4/2006 | Satoyama | ........... | G06F 11/1435 711/162 |
| 2009/0037418 A1* | 2/2009 | Xu | ....................... | G06F 11/1435 |
| 2011/0295804 A1* | 12/2011 | Erofeev | .............. | H04L 29/0854 707/634 |
| 2016/0321145 A1* | 11/2016 | Fang | ................... | G06F 11/1471 |
| 2017/0032013 A1* | 2/2017 | Zheng | .................. | G06F 16/285 |
| 2017/0220658 A1* | 8/2017 | Goldmann | .............. | G06F 16/27 |

OTHER PUBLICATIONS

Google Search (Year: 2015).*

* cited by examiner

*Primary Examiner* — Mark D Featherstone
*Assistant Examiner* — Kweku William Halm
(74) *Attorney, Agent, or Firm* — Krishnendu Gupta; Lesley Leonessa

(57) ABSTRACT

A system, computer program product, and computer-executable method of providing remote snapshot access from a target site within a data storage system including a source site and the target site, the system, computer program product, and computer-executable method including receiving a request to replicate a snapshot from the source site to the target site, initializing replication of the snapshot, providing access to the replicated snapshot at the target site, and processing the replication of the snapshot to create a replicated snapshot.

15 Claims, 11 Drawing Sheets

REMOTE SNAPSHOT ACCESS IN A REPLICATION SETUP

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method of providing remote snapshot access from a target site within a data storage system including a source site and the target site, the system, computer program product, and computer-executable method including receiving a request to replicate a snapshot from the source site to the target site, initializing replication of the snapshot, providing access to the replicated snapshot at the target site, and processing the replication of the snapshot to create a replicated snapshot.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
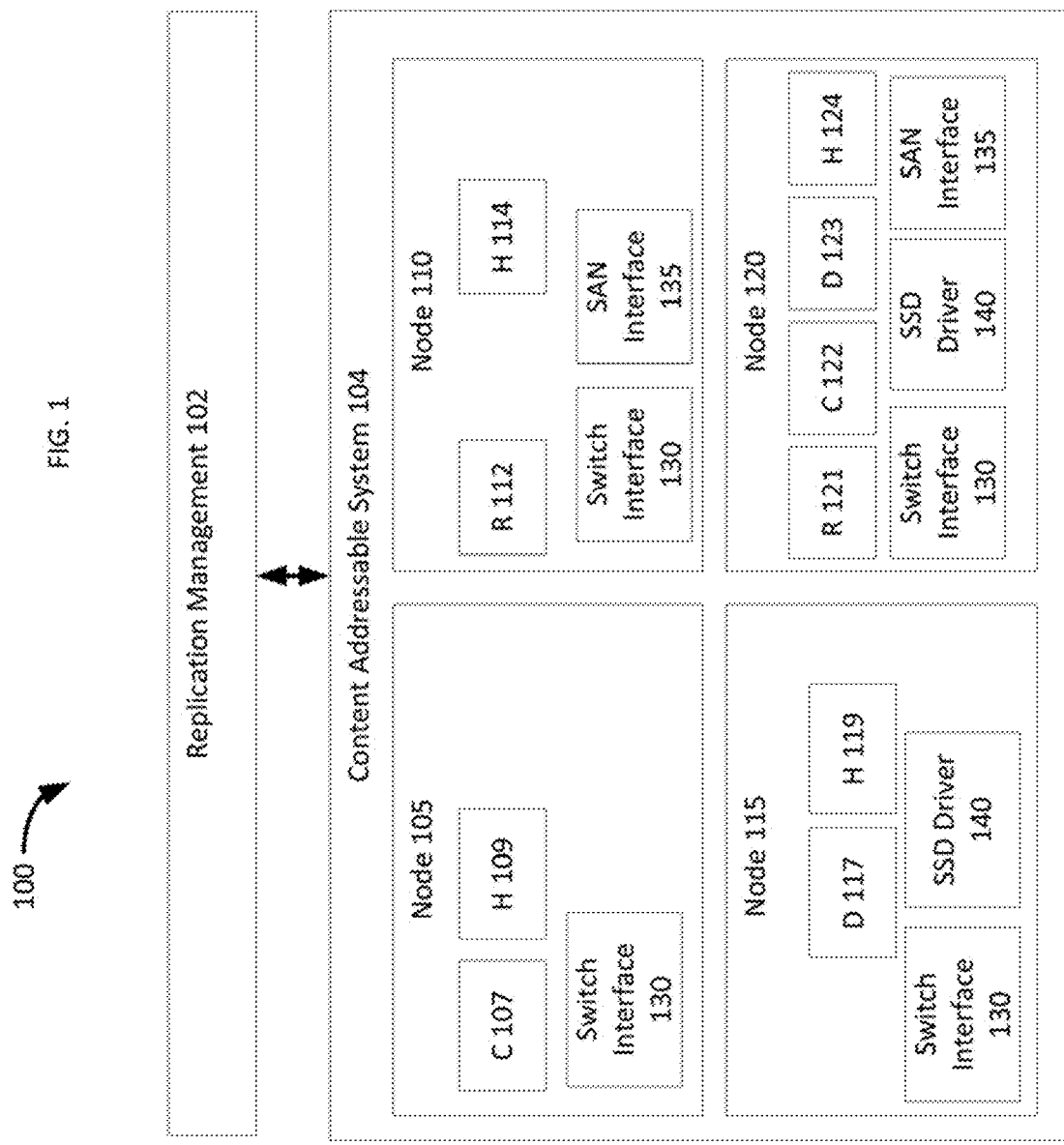
FIG. 1 is a simplified illustration of a data storage system including a content addressable system (clusters), in accordance with an embodiment of the present disclosure.

Traditionally, data storage systems use replication to maintain data between a source site and a target site. Generally, once a replication session is configured, the replication session transfers data updates from source to target continuously without manual intervention. Typically, data storage systems replicate data volumes and snapshots. Typically, a user may want to access a snapshot stored in a remote location but cannot because generally snapshots are not available to users until replication has been completed. Generally, the data storage industry would benefit from increased availability of replicated snapshots.

In many embodiments, the current disclosure may enable a data storage system to provide access to replicated snapshots during replication. In various embodiments, the current disclosure may enable a data storage system to provide access to a replicated snapshot instantaneously. In some embodiments, a data storage system may be enabled to provide access to a replicated snapshot the moment replication has been initiated.

Hash-Based Replication

In a Content Addressable Storage (CAS) array, data is stored in blocks, for example of 4 KB, where each block has a unique large hash signature, for example of 20 bytes, saved on Flash memory. As described herein, hash signatures are accessed by small in-memory handles (Called herein short hash handles), for example of 5 bytes. These handles are unique to each array, but not necessarily unique across arrays. When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it is faster to send the data without a hash signature, and let the target calculate the hash signature.) While the short hash handles are readily available without the need to read from Flash, since the short hash handles are not unique, they cannot be easily used to check if a target contains a hash signature. In some implementations, short hash handles are shortcuts for hash signatures, and can give a reliable hint of the existence of a hash signature in an array. Described herein is an approach to use these short hash handles, verify them through the hash signature, and send the data as needed. While the description describes using this approach with de-duplication storage devices, it would be appreciated by one of ordinary skill in the art that the approach described herein may be used with any type of storage device including those that do not use de-duplication.

The examples described herein include a networked memory system. The networked memory system includes multiple memory storage units arranged for content addressable storage of data. The data is transferred to and from the storage units using separate data and control planes. Hashing is used for the content addressing, and the hashing produces evenly distributed results over the allowed input range. The hashing defines the physical addresses so that data storage makes even use of the system resources.

A relatively small granularity may be used, for example with a page size of 4 KB, although smaller or larger block sizes may be selected at the discretion of the skilled person. This enables the device to detach the incoming user access pattern from the internal access pattern. That is to say the incoming user access pattern may be larger than the 4 KB or other system-determined page size and may thus be converted to a plurality of write operations within the system, each one separately hashed and separately stored.

Content addressable data storage can be used to ensure that data appearing twice is stored at the same location. Hence unnecessary duplicate write operations can be identified and avoided. Such a feature may be included in the present system as data deduplication. As well as making the system more efficient overall, it also increases the lifetime of those storage units that are limited by the number of write/erase operations.

The separation of Control and Data may enable a substantially unlimited level of scalability, since control operations can be split over any number of processing elements, and data operations can be split over any number of data storage elements. This allows scalability in both capacity and performance, and may thus permit an operation to be effectively balanced between the different modules and nodes.

The separation may also help to speed the operation of the system. That is to say it may speed up Writes and Reads. Such may be due to:

(a) Parallel operation of certain Control and Data actions over multiple Nodes/Modules (b) Use of optimal internal communication/networking technologies per the type of operation (Control or Data), designed to minimize the latency (delay) and maximize the throughput of each type of operation.

Also, separation of control and data paths may allow each Control or Data information unit to travel within the system between Nodes or Modules in the optimal way, meaning only to where it is needed and if/when it is needed. The set of optimal where and when coordinates is not the same for control and data units, and hence the separation of paths ensures the optimization of such data and control movements, in a way which is not otherwise possible. The separation is important in keeping the workloads and internal communications at the minimum necessary, and may translate into increased optimization of performance.

De-duplication of data, meaning ensuring that the same data is not stored twice in different places, is an inherent effect of using Content-Based mapping of data to D-Modules and within D-Modules.

Scalability is inherent to the architecture. Nothing in the architecture limits the number of the different R, C, D, and H modules which are described further herein. Hence any number of such modules can be assembled. The more modules added, the higher the performance of the system becomes and the larger the capacity it can handle. Hence scalability of performance and capacity is achieved.

Further information about Hash-Based Replication may be found in U.S. Pat. No. 9,378,106 issued on Jun. 28, 2016, assigned to EMC Corporation of Hopkinton, Mass. and is hereby incorporated by reference in its entirety.

Remote Snapshot Access in a Replication Setup

In many embodiments, the current disclosure may enable a data storage system to provide access to a replicated snapshot while replicating the snapshot from a source site to a target site. In various embodiments, the current disclosure may enable a data storage system to provide a user access to a replicated snapshot before replication has been completed. In certain embodiments, the current disclosure may enable a data storage system to provide a user access to a replicated snapshot the moment the replication command is issued.

In various embodiments, a data storage system may a source site and a target site. In most embodiments, a source site and/or a target site may be a content addressable storage system. In certain embodiments, a content addressable storage system may be referred to as a data storage array, cluster, source site, target site, and/or CAS system. In some embodiments, a user may want to access a snapshot stored in a remote (target) location. In other embodiments, a replicated snapshot may have been replicated from a source array and may now be required for recovery. In certain embodiments, a replicated snapshot may represent data and/or an application that may need to be started on another array.

In most embodiments, a data storage system may at least include two storage arrays. In various embodiments, the two storage arrays may be a source site and a target site. In certain embodiments, a source site may store one or more snapshots. In other embodiments, A snapshot may be composed of two sets of data:

(1) An A2H table, mapping page addresses to hash handles. For example, a page may be 8 KB and a hash represents a unique page in the storage array (2) The set of all pages corresponding to the hash handles included in the above A2H table In many embodiments, a storage array may maintain a backend service that may be enabled to retrieve a page of data based on its hash handle. In various embodiments, a hash handle may be, for example, a world-wide unique SHA-1 hash (160 bits), or a shortened hash derived from it (48-bit hash handle), as long as it's unique in the array. In some embodiments, when a user desires to migrate a snapshot from a source site to a target site thereby creating a replicated snapshot at the target site. In other embodiments, a snapshot at the source site may be assumed to be static through the process (i.e., read-only) and the replicated snapshot at the target site may be read and/or modified. In most embodiments, an A2H table may map addresses of data pages stored within a data storage system to hash handles and/or hashes of the data.

In many embodiments, a data storage system may include a source site, a target site, and a replication management module. In various embodiments, a replication management module may be direct (by a user) to migrate a snapshot (S1) from a source site to a target to create a replicated snapshot. In these embodiments, a target site may create an empty snapshot (S2) at the target site with an empty A2H table. The target site may initialize a scan pointer P to 0, start the scan process to replicate snapshot S1 to the target site in snapshot S2, and mark snapshot S2 as "migration in process." Upon initiating the replication, the target site may enable reads and writes to snapshot S2 on the target site.

In most embodiments, a target site receiving a replicated snapshot (S2) may have a background scan to process the replication. In these embodiments, a target site may examine the contents of an A2H at the scan pointer P. If the A2H table is empty, the target site may execute the following steps:
1. Lock entry
2. retesting entry to determine if filled with data
3. Send a read request to a source site to retrieve the data page associated with address P
4. wait to receive data page from source site
5. Once data page received, write page of data to target site at location P, while updating the A2H table at P.
6. unlock entry.

Upon completion, a target site may increment the scan pointer P to the next address. In most embodiments, while it is not the end of the volume, the target site may continue examining the contents of the A2H at the scan pointer and repeating steps 1-6 (Shown above). In various embodiments, once all contents of the A2H table has been examined, the target site removes the "migration in process" indication and signals that the replicated snapshot is complete.

In most embodiments, a user may be enabled to read from a replicated snapshot (S2) while the replication is being processed. In various embodiments, if the target site receives a read request during replication, the target site determines if the snapshot (S2) is marked as "migration in process." In certain embodiments, for each of the addresses in the range of the Read command, if the snapshot (S2) is not marked as "migration in process," target site may treat the replicated snapshot as complete and execute the read request normally.

In many embodiments, if a snapshot is marked as "migration in process," the target site may process the read command based on the progress of the replication of the snapshot from the source site to the target site. In various embodiments, if the requested address is below the scan pointer P, the target site may process the read request normally. In other embodiments, if the requested address is above the scan pointer, a target site may lock an A2H entry for the requested address. In these embodiments, if the A2H table at the requested address is not empty, use it to retrieve the data page and unlock the entry. If the A2H table at the requested address is empty, the target site may send a read request to the source site to retrieve the data page at the requested address, receive the page of data, write the page of data to the address, and unlock the entry in the A2H table.

In most embodiments, a user may be enabled to write to a snapshot at a target site during replication from a source site. In various embodiments, if a volume is not marked as "migration in process, the target site executes the write normally. In certain embodiments, for each of the addresses in the range of the write command, if the address is below the scan pointer P, the target site executes the write normally. In other embodiments, the target site may lock the A2H entry for the addresses, execute the write to the page, and unlock the address.

Refer to the example embodiment of FIG. 1. FIG. 1 is a simplified illustration of a data storage system including a content addressable system (clusters), in accordance with an embodiment of the present disclosure. Data storage system 100 includes replication management 102, content addressable storage (CAS) system 104. In many embodiments, data storage system 100 may be enabled to manage multipole CAS systems. CAS 104 has been expanded to show a possible implementation. CAS system 104 includes nodes 105, 110, 115, 120. Node 105 includes a control module 107, hash module 109, and a switch interface 130. Node 110 includes a routing module 112, hash module 114, switch interface 130, and SAN interface 135. Node 115 includes a data module 117, a hash module 119, switch interface 130, and SSD Driver 140. Node 120 includes a routing module 121, a control module 122, a data module 123, a hash module 124, a switch interface 130, ssd driver 140, and SAN interface 135. Nodes 105, 110, 115, 120 are enabled to use switch interfaces 130 on each respective node to communicate with other nodes within CAS 104. CAS 104 uses SSD Driver 140 to communicate with data storage managed by CAS 104. CAS 104 uses SAN interface 135 to communicate with other clusters within data storage system 100 and replication management 102. In some embodiments, each node 105, 110, 115, 120 may be enabled to use switch interface to communicate with replication management 102 and/or other clusters within data storage system 100. Other clusters within data storage system 100 can be implemented in a similar manner; however the distribution of control modules, hash modules, routing modules, and data modules may differ. In some embodiments, each node within a cluster may include one of each type of module. Replication management 102 is in communication with CAS 104. Replication management 102 is enabled to provide commands to CAS 104. Replication management 102 is enabled to direct either CAS 104 to replicate to a target site.

Figure 2:
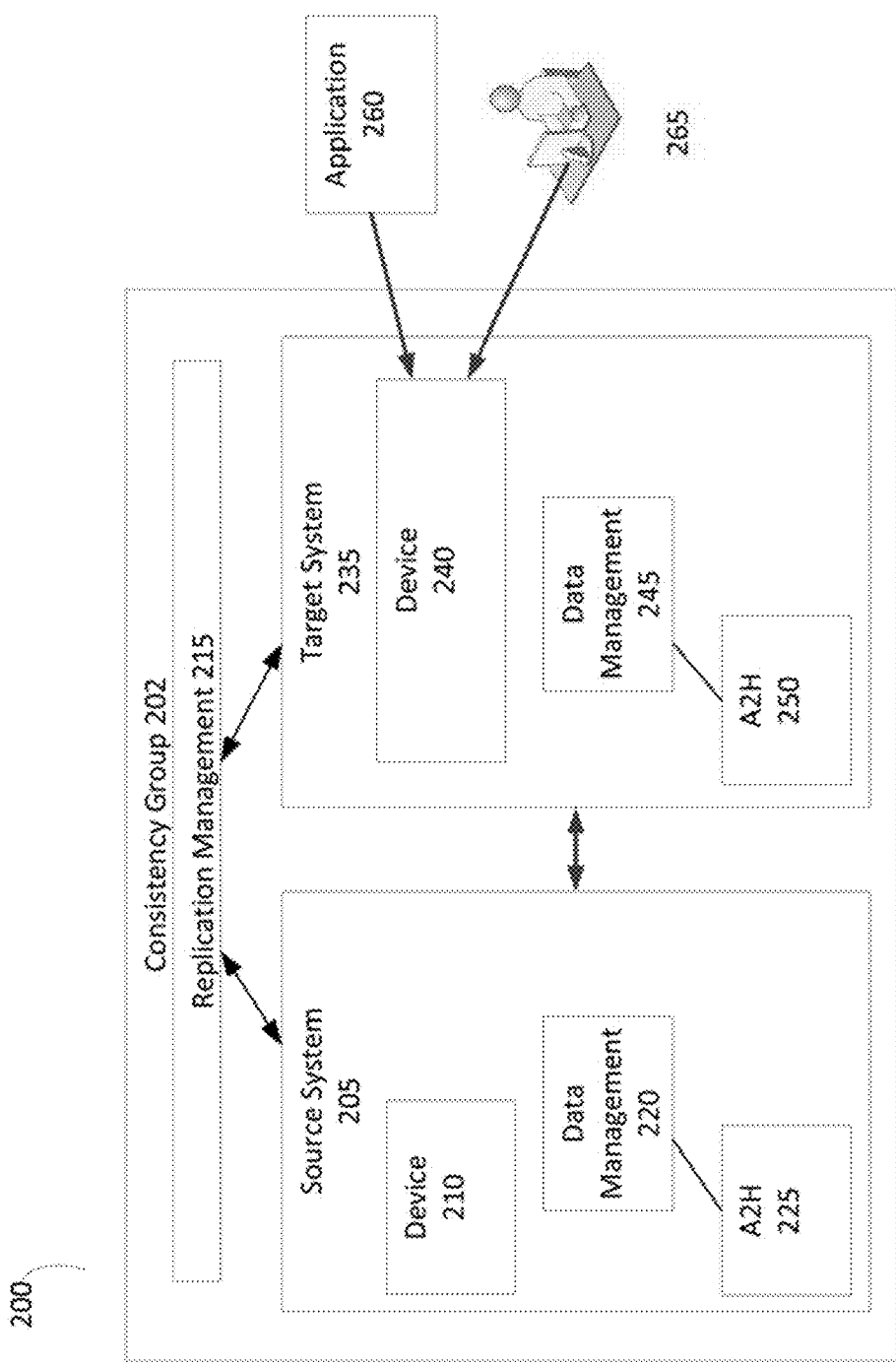
FIG. 2 is a simplified illustration of a data storage system including a source site and a target site, in accordance with an embodiment of the present disclosure.

Refer to the example embodiments of FIG. 2. FIG. 2 is a simplified illustration of a data storage system including a source site and a target site, in accordance with an embodiment of the present disclosure. Data storage system 200 includes replication management 215, source system 205, and target system 235. In this embodiment, source system 205 and target system 235 are in consistency group 202. Replication management module 215 is enabled to direct source system 205 to replicate data to target system 235. Source system 205 includes device 210 and data management 220. Data management 220 includes A2H 225 which contains information on data stored within device 235. In many embodiments, data management 220 and data management 245 may be control modules and/or data modules within a CAS system as described above.

Target system 235 includes device 240 and data management 245. Data management 245 includes A2H table 250. In this embodiment, application 260 and user 265 is enabled to access snapshots on device 240 that was replicated from device 210. Replicated data in device 240 is enabled to be accessed upon the start of replication from source system 205 to target system 235. Application 260 and user 265 is enabled to access replicated data within device 240 the instant that replication is initiated. In many embodiments, a device may refer to a volume, data storage, and/or other storage devices.

Figure 3:
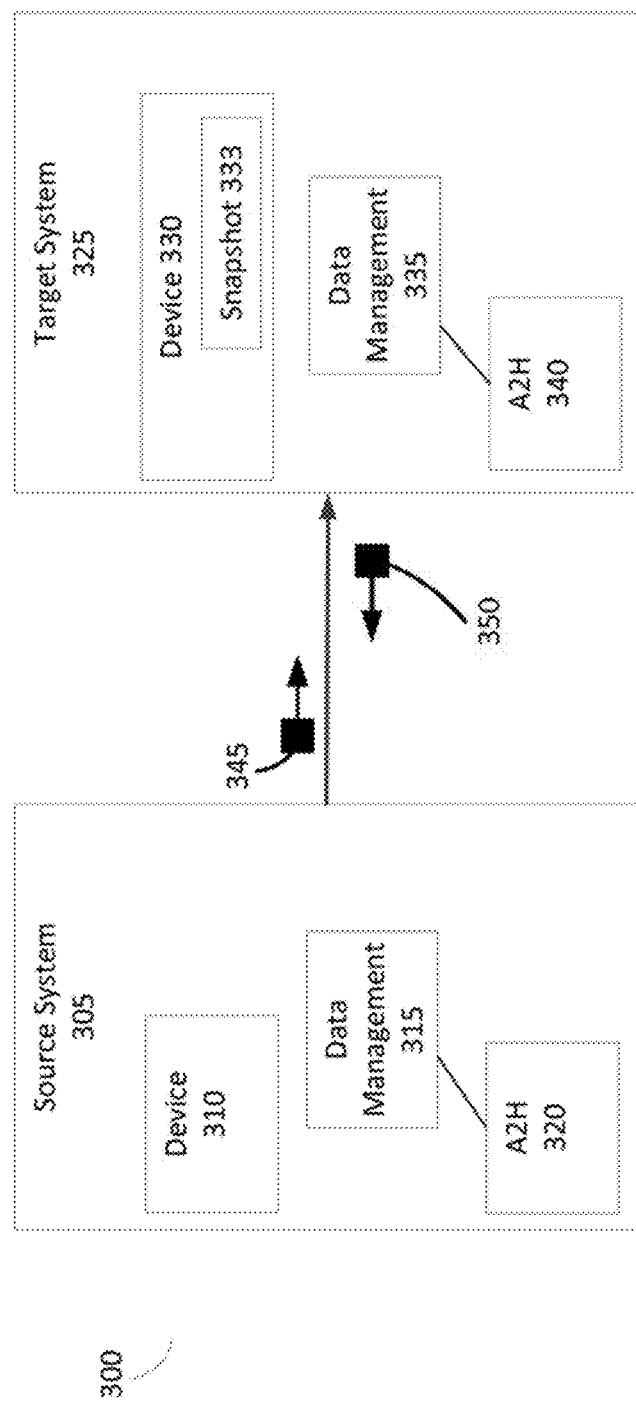
FIG. 3 is a simplified illustration of communication between a source site and a target site within a data storage system, in accordance with an embodiment of the present disclosure.

Refer to the example embodiment of FIG. 3. FIG. 3 is a simplified illustration of communication between a source site and a target site within a data storage system, in accordance with an embodiment of the present disclosure. Data storage system 300 includes source system 305 and target system 325. source system 305 includes device 310 and data management 315. Data management 315 includes A2H table 320, which is a mapping of addresses of data stored on source system 305 to hashes. Target system 325 includes device 330 and data management 335. In this embodiment, device 330 includes snapshot 333 which is replicated device 310 on source system 305. Data management 335 includes A2H table 340 relating to data stored on target system 325. Target system 325 is enabled to provide read and/or write access to snapshot 333 upon initiation of replication from source system 305 to target system 325 using message 345 and message 350. Read and/or write access to snapshot 333 is enabled to be provided by target system 325 during replication from source system 305 to target system 325.

Figure 4:
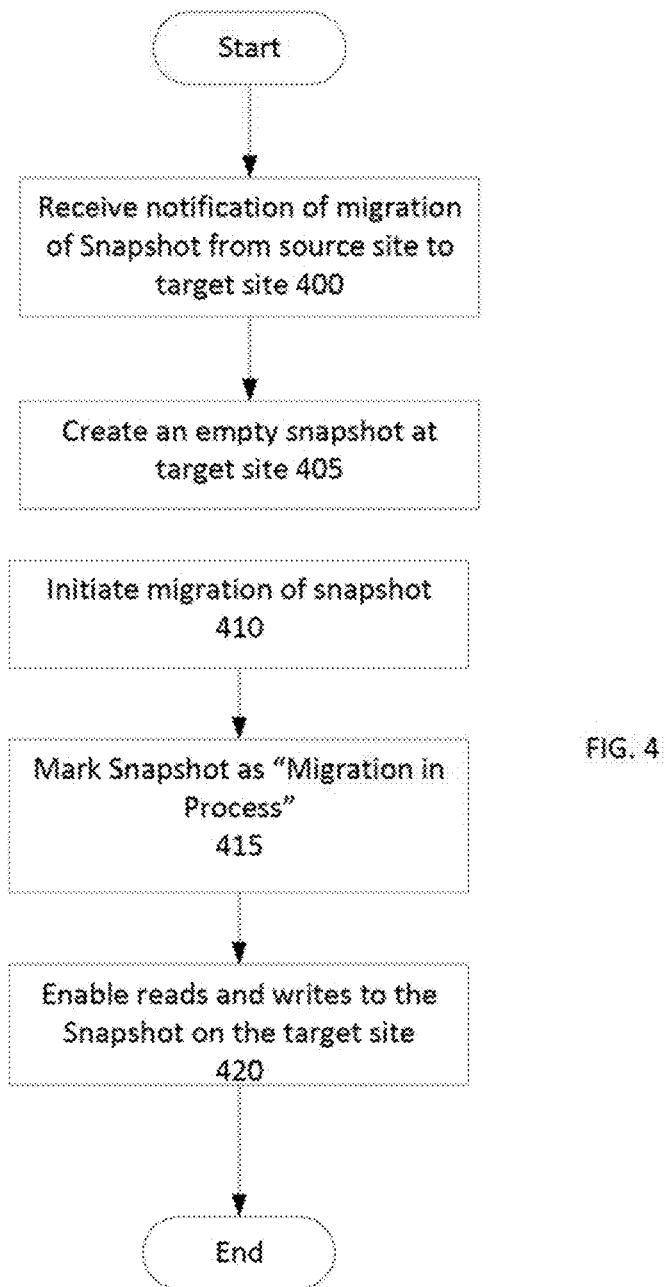
FIG. 4 is a simplified flowchart of a method of initiating replication of a snapshot from a source site to a target site, in accordance with an embodiment of the present disclosure.

Refer to the example embodiments of FIGS. 3 and 4. FIG. 4 is a simplified flowchart of a method of initiating replication of a snapshot from a source site to a target site, in accordance with an embodiment of the present disclosure. Data storage system 300 includes source system 305 and target system 325. Target site 325 receives a notification of migration of a snapshot based on data in device 310 from source site 305 to target site 325 (Step 400). Target site creates an empty snapshot 333 at the target site (Step 405). Source system 305 initiates migration of the snapshot to target system (Step 410). Target system marks snapshot 333 as "migration in process" (Step 415). Target system 325 enables reads and writes to snapshot 333 (Step 420).

Figure 5:
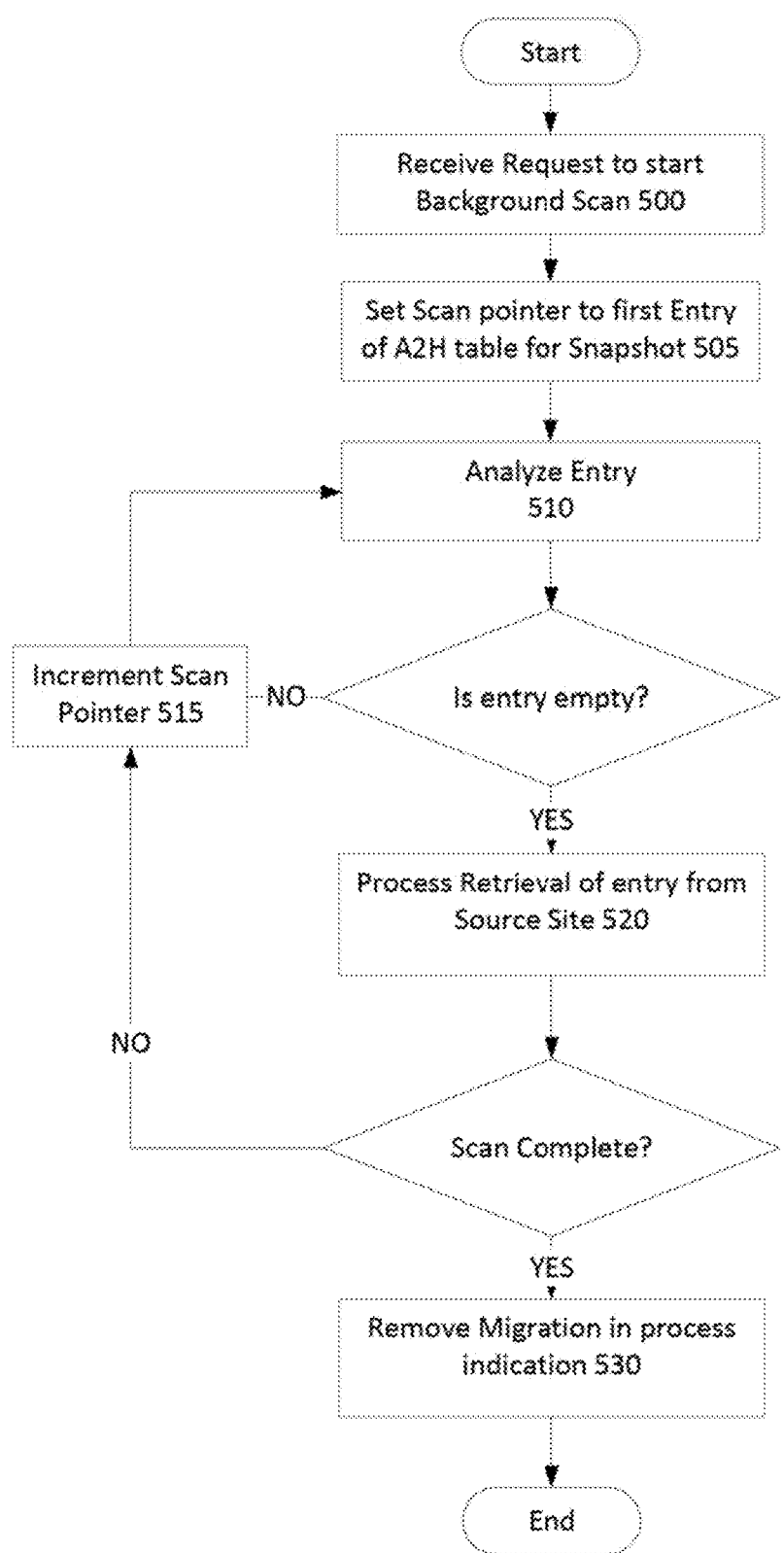
FIG. 5 is a simplified flowchart of a method of processing replication of a snapshot in the background, in accordance with an embodiment of the present disclosure.

Refer to the example embodiments of FIGS. 3 and 5. FIG. 5 is a simplified flowchart of a method of processing replication of a snapshot in the background, in accordance with an embodiment of the present disclosure. Data storage system 300 includes source system 305 and target system 325. Data management 335 receives request to start background scan to facilitate access to snapshot 333 (Step 505). Data management 335 sets scan pointer to first entry of A2H table for snapshot 333 (Step 505). Data management module 335 analyzes entry (Step 510). If the entry is not empty, data management 335 increments the scan pointer (Step 515) and analyzes the next entry (Step 510) in the A2H table associated with snapshot 333. If the entry is empty, data management 335 processes retrieval of data associated with entry from source site 305 (Step 520). If the scan process is complete, data management 335 removes the "migration in process" indication (Step 530) and completes processing. If the scan process is not complete, data management 335 increments the scan pointer (Step 515) and analyzes the next entry (Step 510) in the A2H table associated with snapshot 333.

Figure 6:
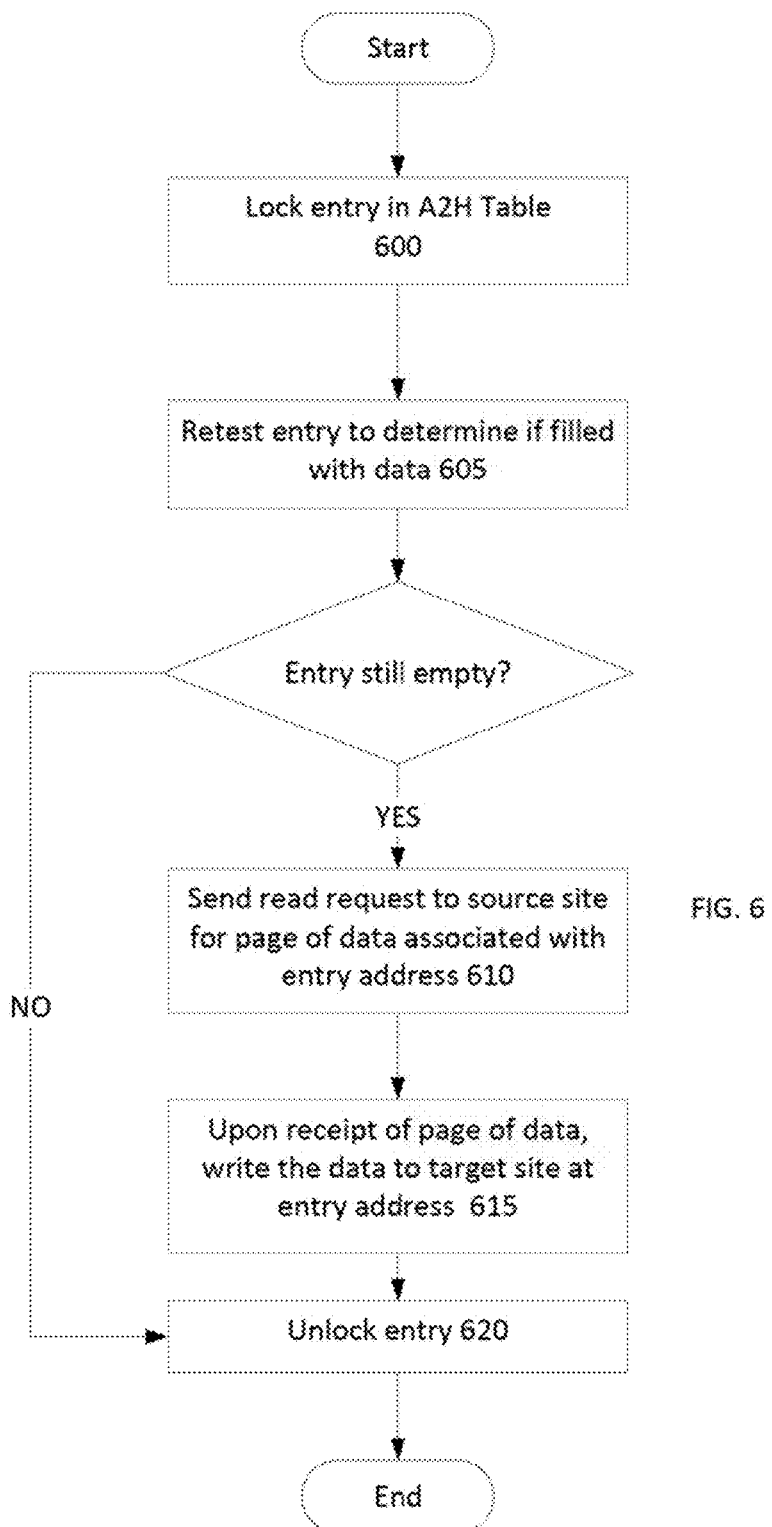
FIG. 6 is a simplified flowchart of a method of processing retrieval of an entry from a source site as mentioned in FIG. 5, in accordance with an embodiment of the present disclosure.

Refer to the example embodiments of FIGS. 5, and 6. FIG. 6 is a simplified flowchart of a method of processing retrieval of an entry from a source site as mentioned in FIG. 5, in accordance with an embodiment of the present disclosure. Upon initiating process retrieval (Step 520, FIG. 5), Data management 335 locks the current entry in the A2H table (Step 600) and retests the current entry to determine if was filled with data from source site (Step 506). In many embodiments, an entry may be rechecked to account for possible race conditions when locking and/or unlocking entries. If the entry is filled, data management 335 unlocks the entry (Step 620). If the entry is still empty, data management 335 sends a read request to source site 305 for the page of data associated with the entry address using message 350 (Step 610). Upon receipt of the requested page of data, received in message 345, data management 335 writes the data to the target site at the entry address (Step 615) and unlocks the entry (Step 620).

Figure 7:
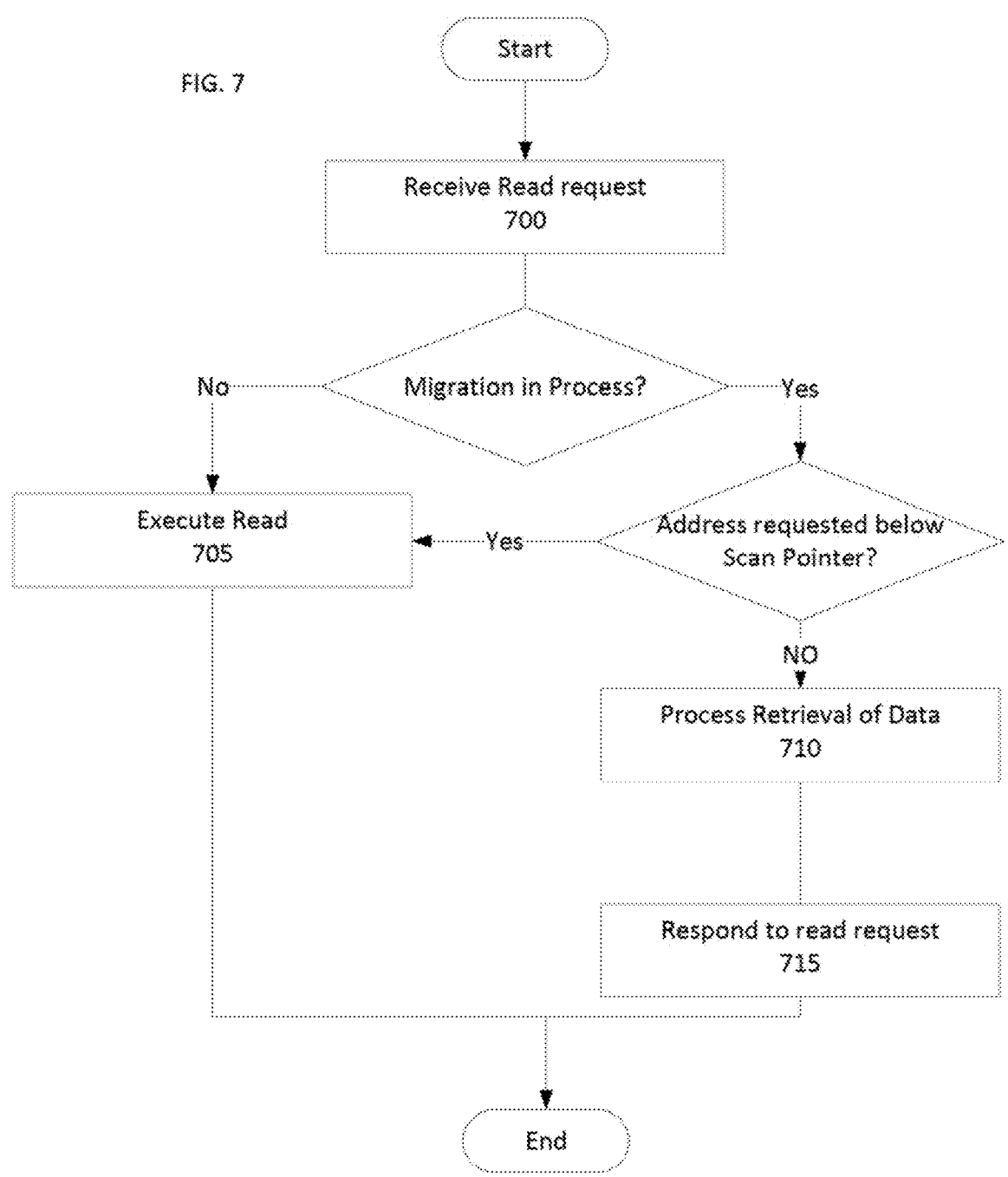
FIG. 7 is a simplified flowchart of a method of reading data from a snapshot while replicating the snapshot from a source site to a target site, in accordance with an embodiment of the present disclosure.

Refer to the example embodiments of FIGS. 2 and 7. FIG. 7 is a simplified flowchart of a method of reading data from a snapshot while replicating the snapshot from a source site to a target site, in accordance with an embodiment of the present disclosure. Data storage system 200 includes replication management 215, source system 205, and target system 235. Target system 235 receives a read request from application 260 for a snapshot on device 240 (Step 700). If migration has completed for the snapshot, data management 245 executes the read normally to the snapshot stored on device 240 (Step 705). If migration is still in process and the requested address is below the scan pointer, data management 245 executes the read normally to the snapshot stored on device 240 (Step 705). If migration is still in process and the requested address is above the scan pointer, data management 245 processes retrieval of the data (Step 710) and responds to read request with retrieved data (Step 715)

Figure 8:
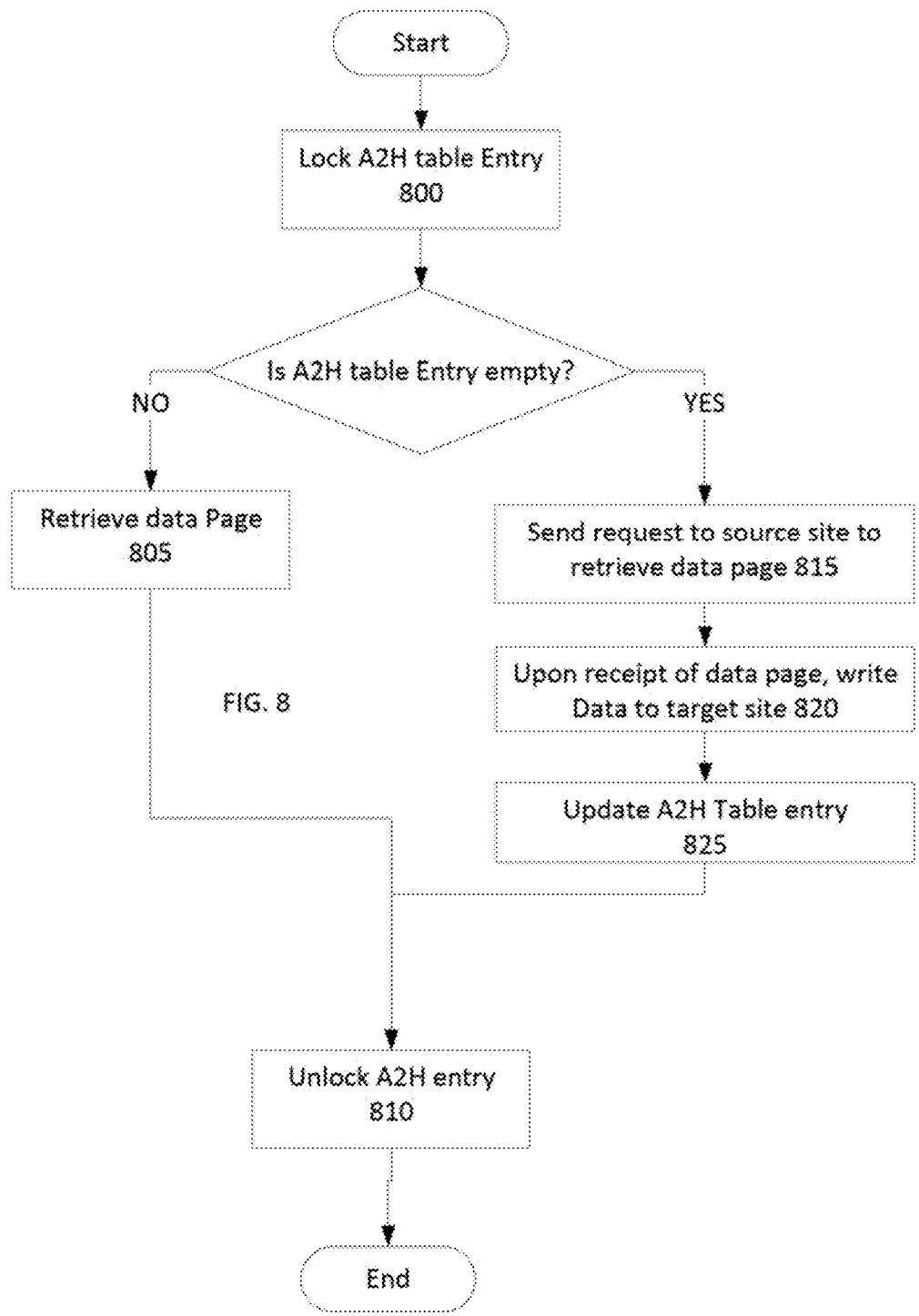
FIG. 8 is a simplified flowchart of a method of processing retrieval of data from a source site (FIG. 2) mentioned if FIG. 7, in accordance of an embodiment of the present disclosure.

Refer to the example embodiment of FIGS. 7 and 8. FIG. 8 is a simplified flowchart of a method of processing retrieval of data from a source site (FIG. 2) mentioned if FIG. 7, in accordance of an embodiment of the present disclosure. Upon initiating process to retrieve data from source site 205, data management 245 locks the A2H table entry (Step 800). If the A2H table entry has data, data management 245 retrieves the data page (Step 805) and unlocks the A2H table entry (Step 810). If the A2H table entry is empty, the data management module 245 sends a request to the source site 205 to retrieve the data page associated with the A2H table entry (Step 815). Upon receipt of the data page, data management 245 writes the data to the target site (Step 820), updates the A2H Table entry (Step 825), and Unlocks the A2H entry (Step 810).

Figure 9:
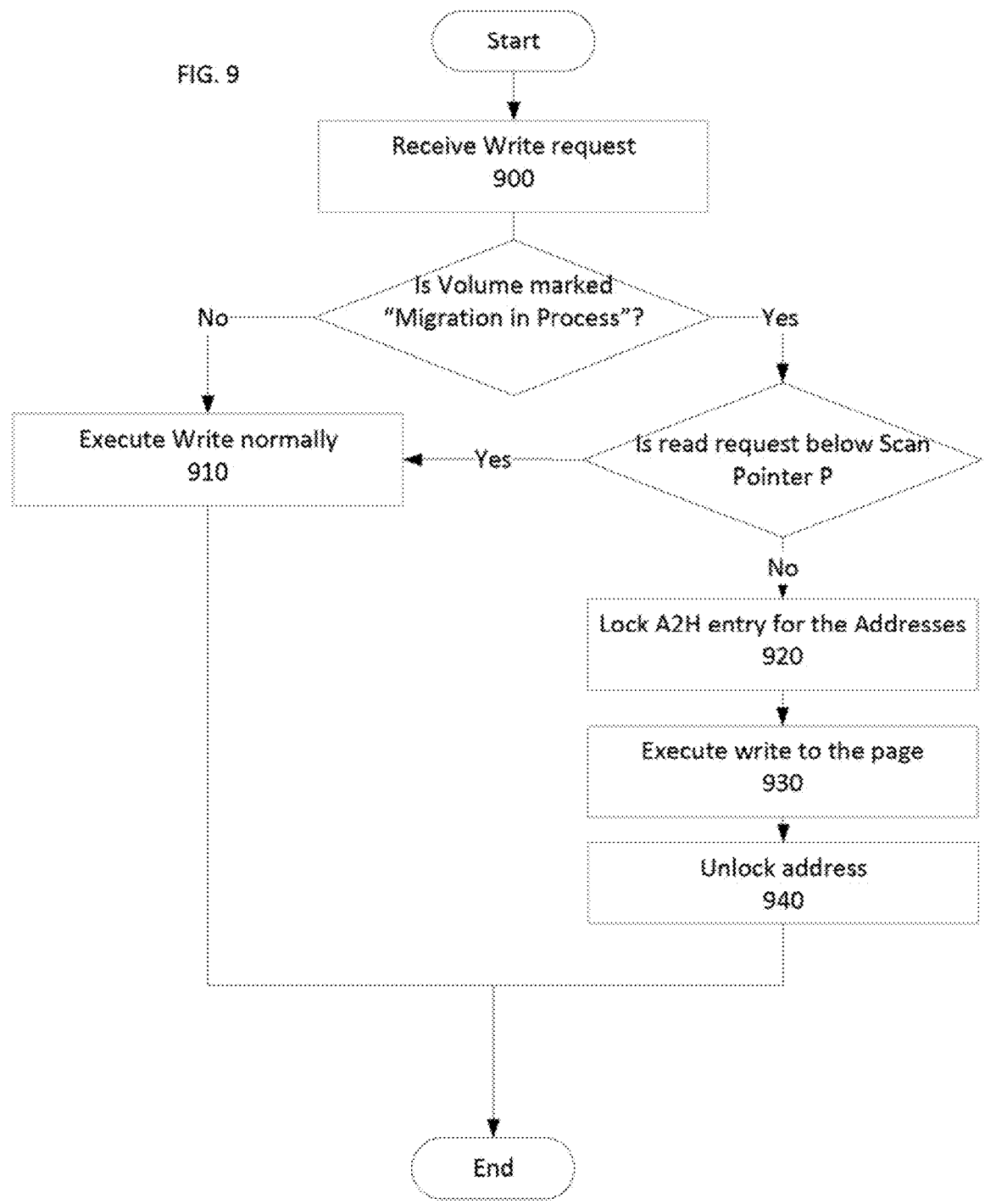
FIG. 9 is a simplified flowchart of a method writing data to a snapshot while replicating from a source site to a target site, in accordance with an embodiment of the present disclosure.

Refer to the example embodiments of FIGS. 2 and 9. FIG. 9 is a simplified flowchart of a method writing data to a snapshot while replicating from a source site to a target site, in accordance with an embodiment of the present disclosure. Data storage system 200 includes replication management 215, source system 205, and target system 235. In this embodiment, target system 235 receives a write request (Step 900) from user 265. Data management 245 determines whether the volume is marked migration in process. If the snapshot is not marked Migration in process, data management 245 executes the write normally (Step 910). If the snapshot is marked Migration in process, data management 245 determines whether the read request is below the scan pointer P. If the read request is below the scan pointer P, data management 245 executes the write normally (Step 910). If the read request is above the scan pointer P, data management 245 locks the A2H 250 entry for the addresses (Step 920), executes the write to the page (Step 930), and unlocks the address (Step 940).

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 10:
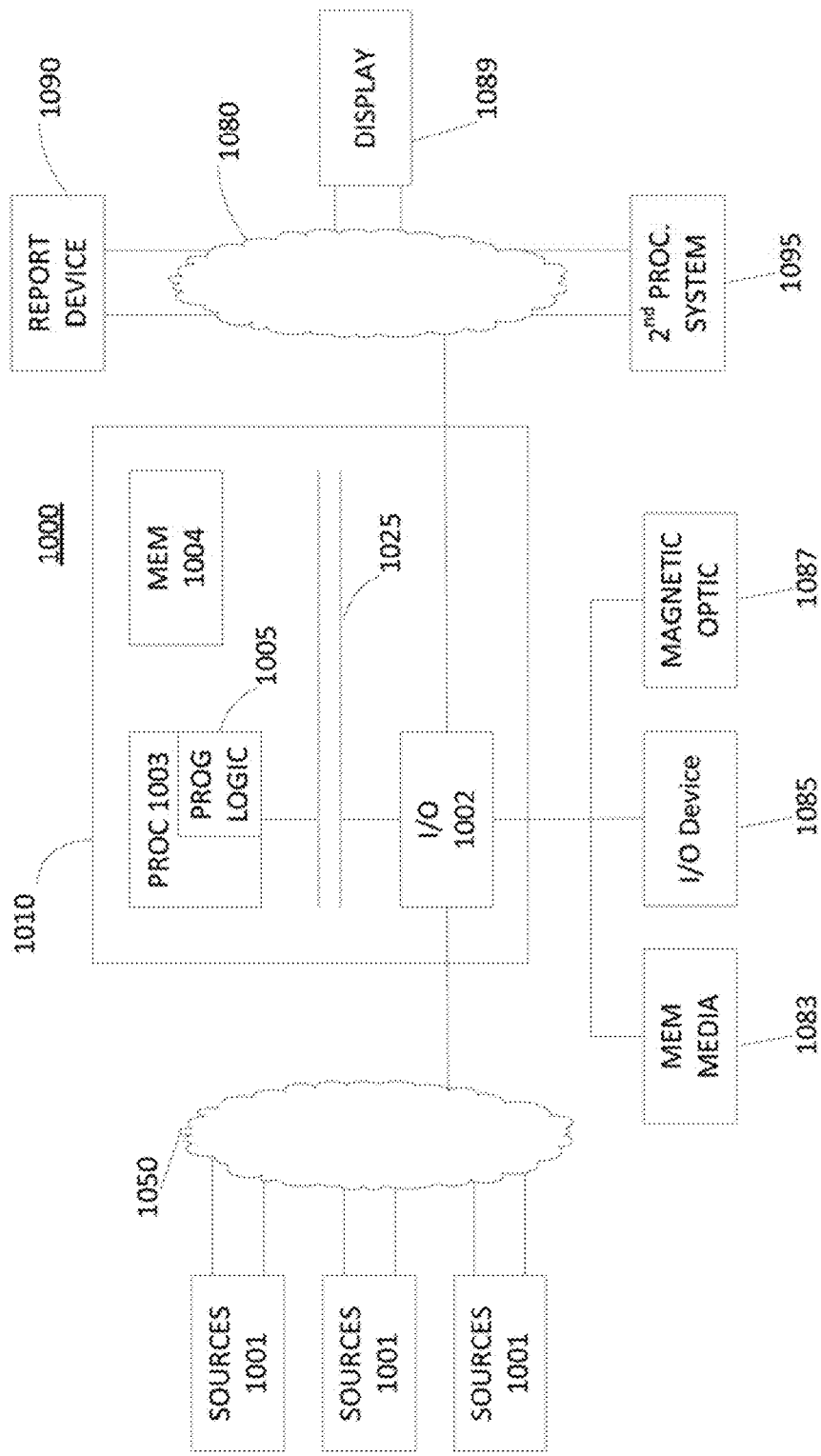
FIG. 10 is an example of an embodiment of an apparatus that may utilize the techniques described herein, in accordance with an embodiment of the present disclosure.

FIG. 10 is a block diagram illustrating an apparatus, such as a computer 1010 in a network 1000, which may utilize the techniques described herein according to an example embodiment of the present invention. The computer 1010 may include one or more I/O ports 1002, a processor 1003, and memory 1004, all of which may be connected by an interconnect 1025, such as a bus. Processor 1003 may include program logic 1005. The I/O port 1002 may provide connectivity to memory media 1083, I/O devices 1085, and drives 1087, such as magnetic drives, optical drives, or Solid State Drives (SSD). When the program code is loaded into memory 1004 and executed by the computer 1010, the machine becomes an apparatus for practicing the invention. When implemented on one or more general-purpose processors 1003, the program code combines with such a processor to provide a unique apparatus that operates analogously to specific logic circuits. As such, a general purpose digital machine can be transformed into a special purpose digital machine.

Figure 11:
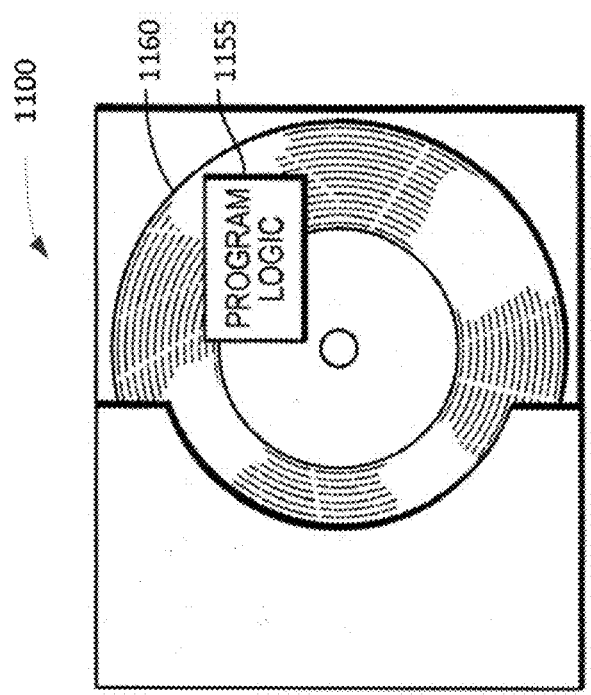
FIG. 11 is an example of a method embodied on a computer readable storage medium that may utilize the techniques described herein, in accordance with an embodiment of the present disclosure.

FIG. 11 is a block diagram illustrating a method embodied on a computer readable storage medium 1160 that may utilize the techniques described herein according to an example embodiment of the present invention. FIG. 11 shows Program Logic 1155 embodied on a computer-readable medium 1160 as shown, and wherein the Logic is encoded in computer-executable code configured for carrying out the methods of this invention and thereby forming a Computer Program Product 1100. Program Logic 1155 may be the same logic 1005 on memory 1004 loaded on processor 1003 in FIG. 10. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-11. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of providing remote snapshot access from a target site within a data storage system including a source site and the target site, the computer-executable method comprising:
receiving a request to replicate a snapshot from the source site to the target site;
initializing replication of the snapshot;
processing the replication of the snapshot to create a replicated snapshot, wherein the processing comprises scanning a table, which includes references to data included in the replicated snapshot, determining whether an entry within the table is empty, and upon a positive determination, updating the entry; and
enabling reads and writes to the replicated snapshot at the target site prior to completion of the creation of the replicated snapshot, wherein a scanning process, that scans an address to hash table, is used to determine whether the respective reads and writes are requested at addresses that have completed the replication, wherein the scanning process includes a scan pointer that delineates how write requests are processed.

2. The computer-executable method of claim 1, wherein initialization of replication comprises:
creating the replicated snapshot, wherein initially the replicated snapshot is a blank snapshot at the target site;
designating the replicated snapshot as migration in process; and
replicating the snapshot from the source site to the replicated snapshot at the target site.

3. The computer-executable method of claim 1, wherein updating the entry comprises:
locking the entry;
sending a request to the source site to retrieve a page of data associated with the entry;
receiving the data from the source site;
updating the table with information related to the data stored at the target site; and
unlocking the entry.

4. The computer-executable method of claim 1, further comprising:
receiving a read request for the replicated snapshot; and
processing the read request for the replicated snapshot.

5. The computer-executable method of claim 4, wherein the processing of the read request comprises:
determining whether the replicated snapshot is designated migration in process; and
upon a negative determination, process the read request.

6. A system, comprising:
a data storage system including a replication management, a source site, and a target site; and
computer-executable program logic encoded in memory of one or more computers enabled to provide remote snapshot access from a target site within the data storage system, wherein the computer-executable program logic is configured for the execution of:
receiving a request to replicate a snapshot from the source site to the target site;
initializing replication of the snapshot;
processing the replication of the snapshot to create a replicated snapshot, wherein the A processing comprises scanning a table, which includes references to data included in the replicated snapshot, determining whether an entry within the table is empty, and upon a positive determination, updating the entry; and
enabling reads and writes to the replicated snapshot at the target site prior to completion of the creation of the replicated snapshot, wherein a scanning process, that scans an address to hash table, is used to determine whether the respective reads and writes are requested at addresses that have completed the replication, wherein the scanning process includes a scan pointer that delineates how write requests are processed.

7. The system of claim 6, wherein initialization of replication comprises:
creating the replicated snapshot, wherein initially the replicated snapshot is a blank snapshot at the target site;
designating the replicated snapshot as migration in process; and
replicating the snapshot from the source site to the replicated snapshot at the target site.

8. The system of claim 6, wherein updating the entry comprises:
   locking the entry;
   sending a request to the source site to retrieve a page of data associated with the entry;
   receiving the data from the source site;
   updating the table with information related to the data stored at the target site; and
   unlocking the entry.

9. The system of claim 8, wherein the computer-executable program logic is further configured for the execution of:
   receiving a read request for the replicated snapshot; and
   processing the read request for the replicated snapshot.

10. The computer-executable method of claim 9, wherein the processing of the read request comprises:
    determining whether the replicated snapshot is designated migration in process; and
    upon a negative determination, process the read request.

11. A computer program product for providing remote snapshot access from a target site within a data storage system including a source site and the target site, the computer program product comprising:
    a non-transitory computer readable medium encoded with computer-executable code, the code configured to enable the execution of:
    receiving a request to replicate a snapshot from the source site to the target site;
    initializing replication of the snapshot;
    processing the replication of the snapshot to create a replicated snapshot, wherein the A processing comprises scanning a table, which includes references to data included in the replicated snapshot, determining whether an entry within the table is empty, and upon a positive determination, updating the entry; and
    enabling reads and writes to the replicated snapshot at the target site prior to completion of the creation of the replicated snapshot, wherein a scanning process, that scans an address to hash table, is used to determine whether the respective reads and writes are requested at addresses that have completed the replication, wherein the scanning process includes a scan pointer that delineates how write requests are processed.

12. The computer program product of claim 11, wherein initialization of replication comprises:
    creating the replicated snapshot, wherein initially the replicated snapshot is a blank snapshot at the target site;
    designating the replicated snapshot as migration in process; and
    replicating the snapshot from the source site to the replicated snapshot at the target site.

13. The computer program product of claim 11, wherein updating the entry comprises:
    locking the entry;
    sending a request to the source site to retrieve a page of data associated with the entry;
    receiving the data from the source site;
    updating the table with information related to the data stored at the target site; and
    unlocking the entry.

14. The computer program product of claim 11, wherein the code is further configured to enable the execution of:
    receiving a read request for the replicated snapshot; and
    processing the read request for the replicated snapshot.

15. The computer program product of claim 14, wherein the processing of the read request comprises:
    determining whether the replicated snapshot is designated migration in process; and
    upon a negative determination, process the read request.

* * * * *